(12) United States Patent
Chen et al.

(10) Patent No.: US 7,088,587 B2
(45) Date of Patent: Aug. 8, 2006

(54) COMPUTER ENCLOSURE WITH POWER SUPPLY BRACKET

(75) Inventors: Yun Lung Chen, Tu-Chen (TW); Gang Su, Shenzhen (CN)

(73) Assignees: Hong Fu Jin Precision IND (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 0 days.

(21) Appl. No.: 10/839,870

(22) Filed: May 5, 2004

(65) Prior Publication Data

US 2004/0223298 A1 Nov. 11, 2004

(30) Foreign Application Priority Data

May 5, 2003 (TW) .............................. 92208186 U

(51) Int. Cl.
*H05K 5/03* (2006.01)
(52) U.S. Cl. .................. 361/724; 361/759; 248/553; 174/67
(58) Field of Classification Search ........ 361/679–687, 361/724–727, 740–759; 248/560, 551–553, 248/231.9; 312/223.1–223.6; 174/52.1, 174/61, 63, 67
See application file for complete search history.

(56) References Cited

U.S. PATENT DOCUMENTS

| 6,270,046 | B1* | 8/2001 | Liu et al. ................. 248/231.9 |
| 6,272,009 | B1* | 8/2001 | Buican et al. ............. 361/683 |
| 6,685,286 | B1* | 2/2004 | Chen et al. ............. 312/223.2 |
| 2003/0193782 | A1* | 10/2003 | Chen .......................... 361/726 |
| 2005/0185373 | A1* | 8/2005 | Chen et al. ................. 361/685 |

FOREIGN PATENT DOCUMENTS

| TW | 317337 | 10/1997 |
| TW | 455052 | 9/2001 |

* cited by examiner

*Primary Examiner*—Hung Van Duong

(57) ABSTRACT

A computer enclosure includes a cage (40) and a bracket (50). The cage includes a rear panel (10) having a pair of catches (13), a bottom panel (20) having a bent strip (25) defining a cutout (27) therein, and side panel (30) having a latch bar (33) and a latch hook (35). The bracket includes a top wall (51) having a fastener (58) and a second stop (59), a pair side walls (52, 521) having a pair of opposite catches (56), and a rear wall frame (57). One of the side walls includes a board (53) and a first stop (55) at a bottom portion. The bracket sandwiches a power supply (60) in the cage, with the fastener and the second stop respectively engaging with the latch bar and the latch hook, the board engaging with the bent strip and the first stop engaging in the cutout.

19 Claims, 6 Drawing Sheets

COMPUTER ENCLOSURE WITH POWER SUPPLY BRACKET

BACKGROUND OF THE INVENTION

1. Field of the Invention

The present invention relates to computer enclosures, and more particularly to computer enclosures having brackets for retaining power supplies therein.

2. Related Art

Taiwan Patent Application No. 88219428 disclose conventional computer systems in which a power supply is firstly mounted to a bracket, and then the combined bracket and power supply is attached to a rear panel of a computer enclosure with screws. A screwdriver must be used to attach or detach such bracket to or from the enclosure, and it is inconvenient and laborious to manipulate the screws. Furthermore, a typical computer enclosure with power supply is configured such that the power supply must first be removed to gain access to other components within the enclosure. Therefore, it is similarly inconveniently and laborious to have to unscrew and remove the power supply when maintenance or replacement of other components within the enclosure is required.

Taiwan Patent Issue No. 317337 discloses another device for attaching a power supply in a computer. A bracket retaining a power supply therein is attached to a computer enclosure via a lock mechanism of the bracket. The device simplifies attachment and detachment procedures. However, the device still does not solve the problem of having to detach a power supply when maintenance or replacement of other components in the enclosure is required.

An improved computer enclosure which overcomes the above-described problems is desired.

SUMMARY OF THE INVENTION

Accordingly, an object of the present invention is to provide a computer enclosure having a bracket for conveniently attaching or detaching a power supply to or from the enclosure.

To achieve the above object, a computer enclosure of the present invention includes a cage and a bracket. The cage includes a rear plane having a pair of catches, a bottom plane having a bent strip defining a cutout therein, and side panel having a latch bar and a latch hook. The bracket includes a top wall having a fastener and a second stop, a pair of side walls having a pair of opposite catches, and a rear wall frame. One of the side walls includes a board and a first stop at a bottom portion. The bracket sandwiches a power supply in the cage, with the fastener and the second stop respectively engaging with the latch bar and the latch hook, the board engaging with the bent strip and the first stop engaging in the cutout.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
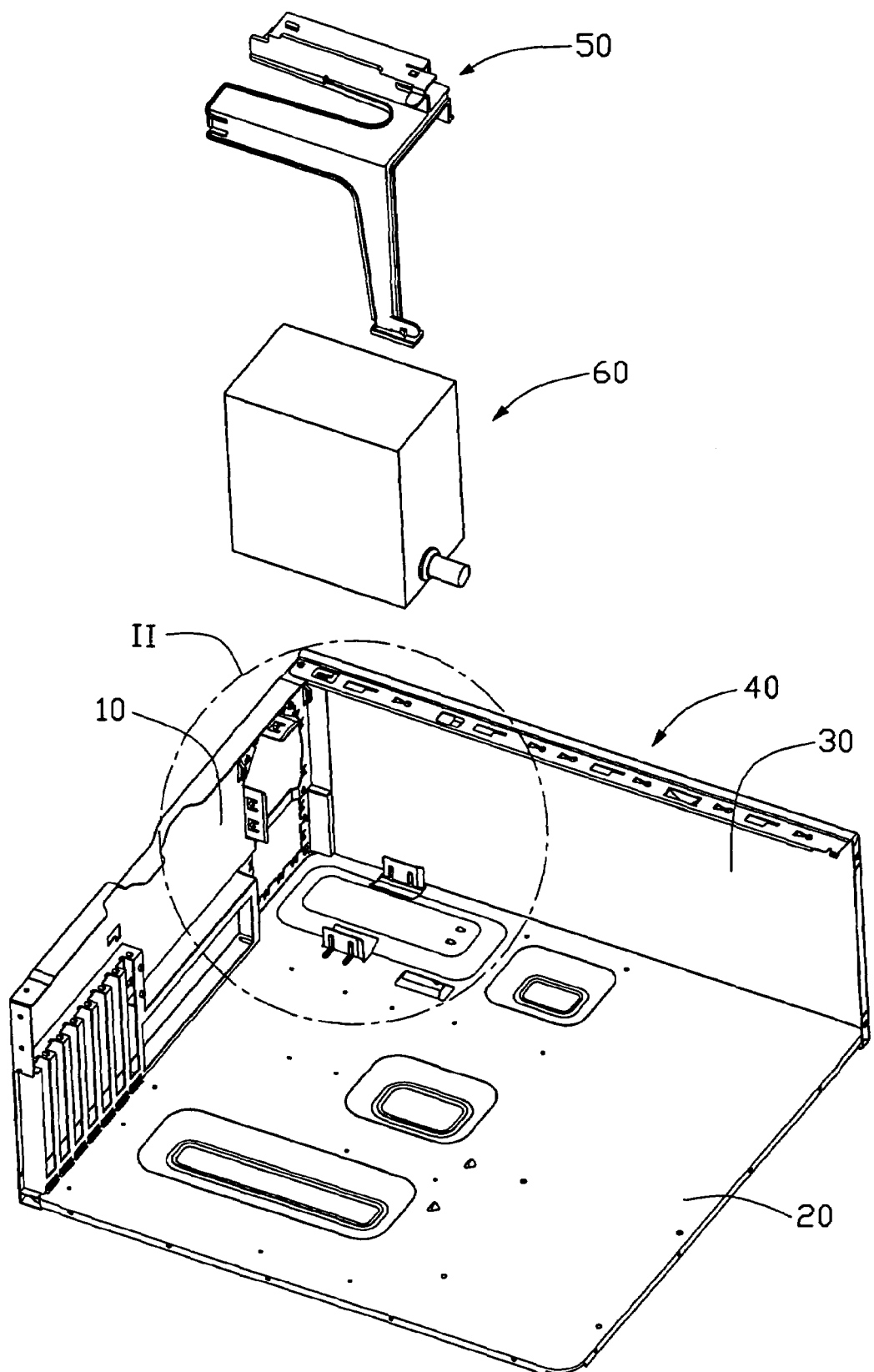
FIG. 1 is an exploded, isometric view of a computer enclosure in accordance with the present invention, together with a power supply.

Referring to FIG. 1, a computer enclosure in accordance with the present invention comprises a cage 40 and a bracket 50. The bracket 50 is for attaching a power supply 60 to the cage 40. The cage 40 comprises a rear panel 10, a bottom panel 20, and a side panel 30.

Figure 6:
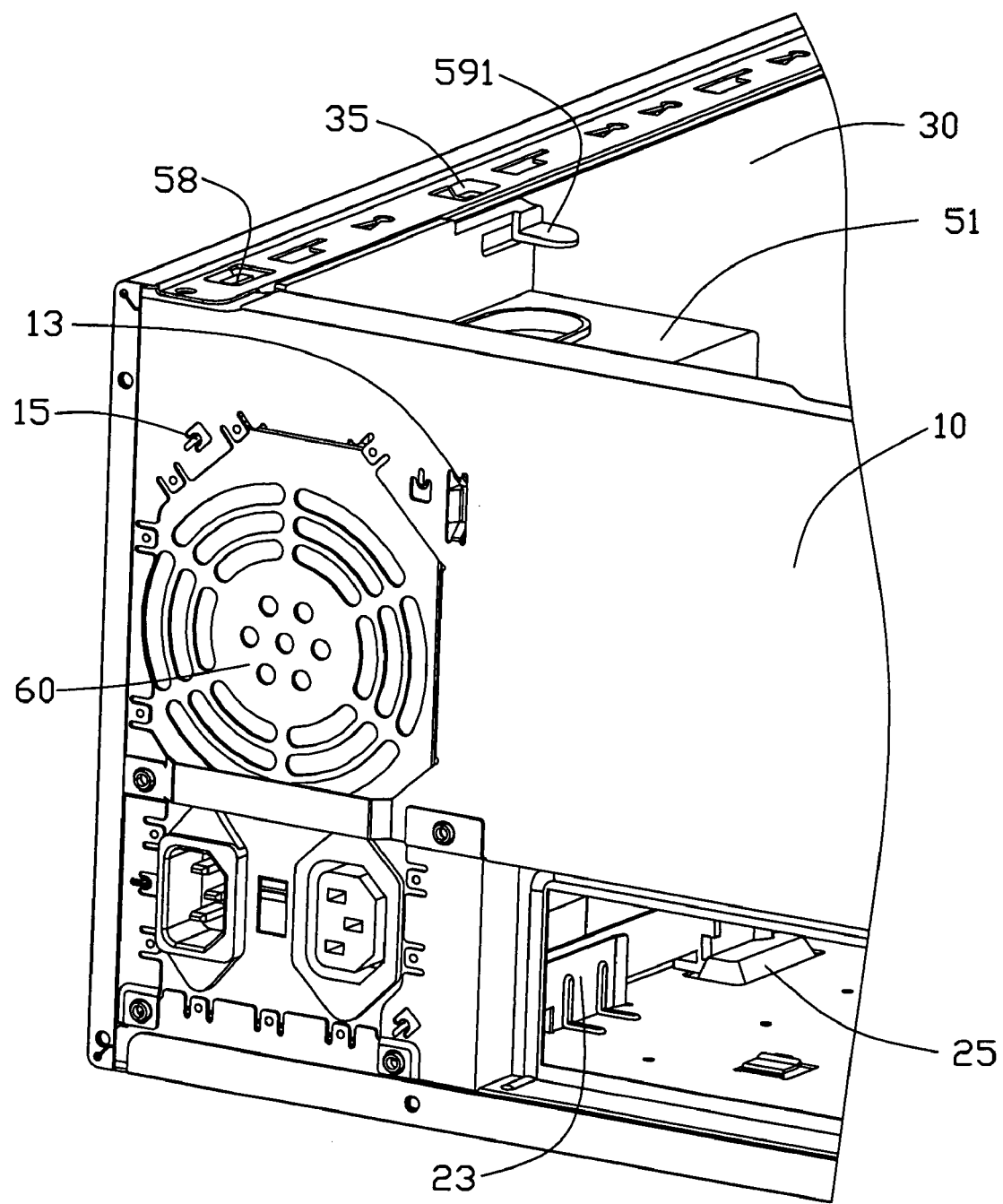
FIG. 6 is similar to FIG. 5, but viewed from another aspect.

Referring to FIG. 6, a rear wall of the power supply 60 comprises an upper fan portion (not labeled) and a lower socket portion (not labeled). A plurality of vents (not labeled) is defined in the rear wall at the fan portion.

Figure 2:
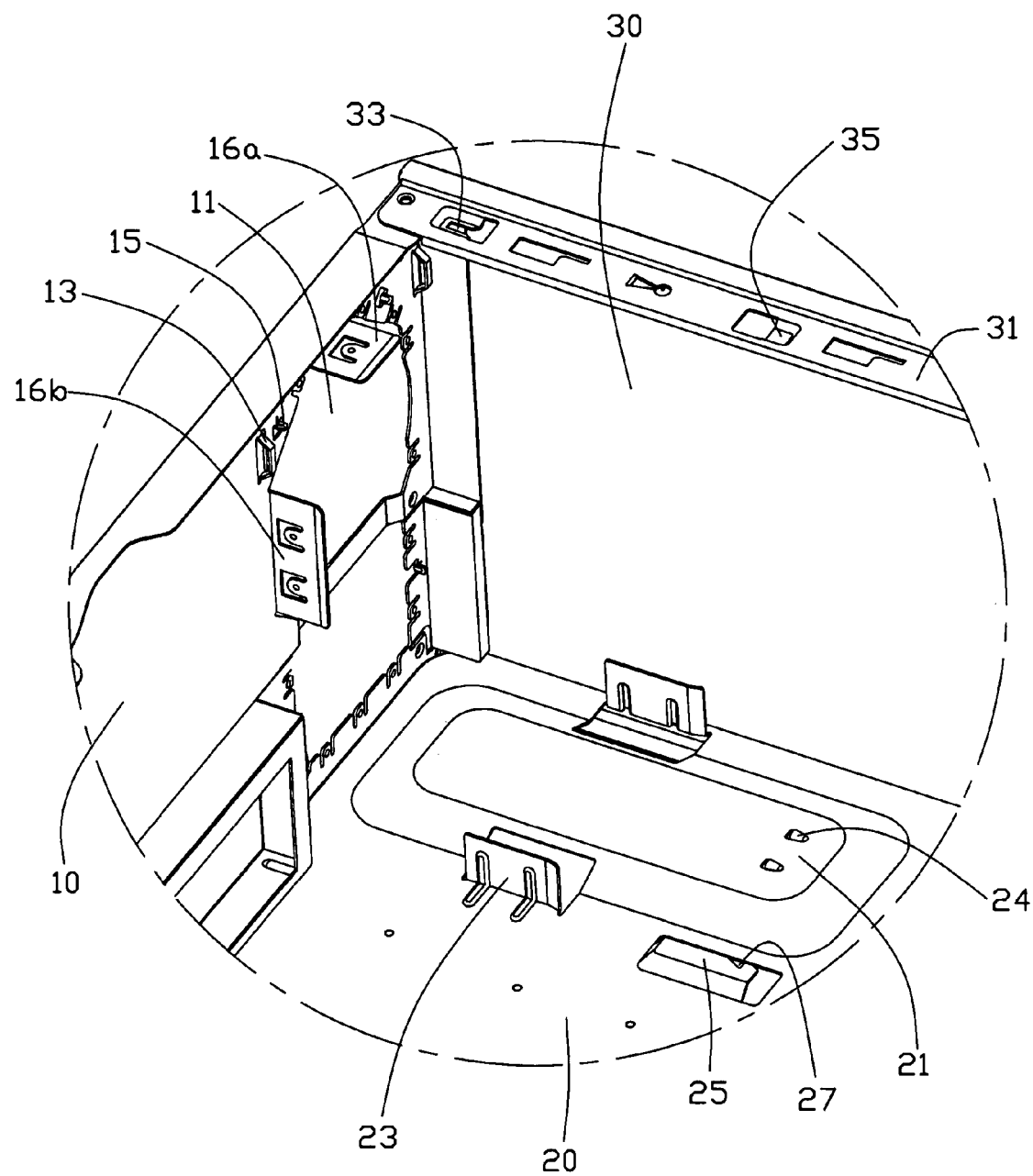
FIG. 2 is an enlarged view of a circled portion II of FIG. 1.

Referring also to FIG. 2, the rear panel 10 defines a pair of spaced openings 11 one above the other adjacent the side panel 30. The openings 11 provide access to the fan portion and socket portion of the fan 60. A horizontal retaining flange 16a extends inwardly from the rear panel 10 above the upper opening 11. A vertical retaining flange 16b extends inwardly from the rear panel 10 at a side of the upper opening 11. A pair of catches 13 extends inwardly from the rear panel 10 at opposite sides of the horizontal retaining flange 16a respectively. A plurality of pins 15 extends inwardly from the rear panel 10 around the upper opening 11.

A raised longitudinal support 21 is formed from the bottom panel 20. The support 21 is oriented parallel to the side panel 30, and corresponds to the openings 11 of the rear panel 10. A pair of retaining plates 23 extends upwardly from the bottom panel 20 at opposite longitudinal sides of the support 21 respectively. A pair of projections 24 is formed on a front portion of the support 21. A bent strip 25 extends from the bottom panel 20 adjacent an inner longitudinal side of the support 21, the bent strip 25 being generally parallel with the side panel 30. A cutout 27 is defined in the bent strip 25.

A horizontal flange 31 extends inwardly from a top edge portion of the side panel 30. A latch bar 33 and a latch hook 35 spaced from the latch bar 33 are formed downwardly from the flange 31.

Figure 3:
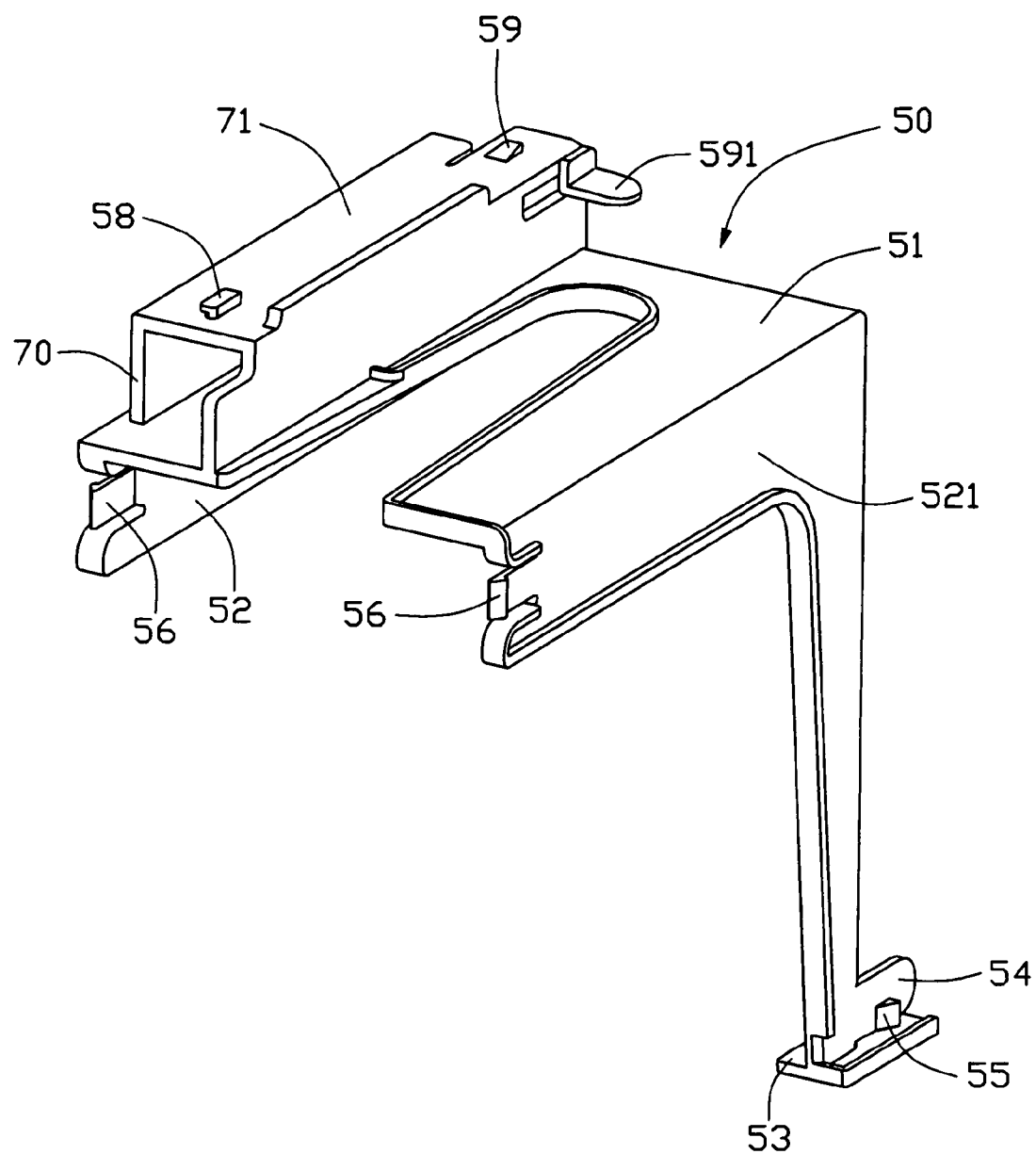
FIG. 3 is an enlarged view of a bracket of the computer enclosure of FIG. 1, but viewed from another aspect.
Figure 4:
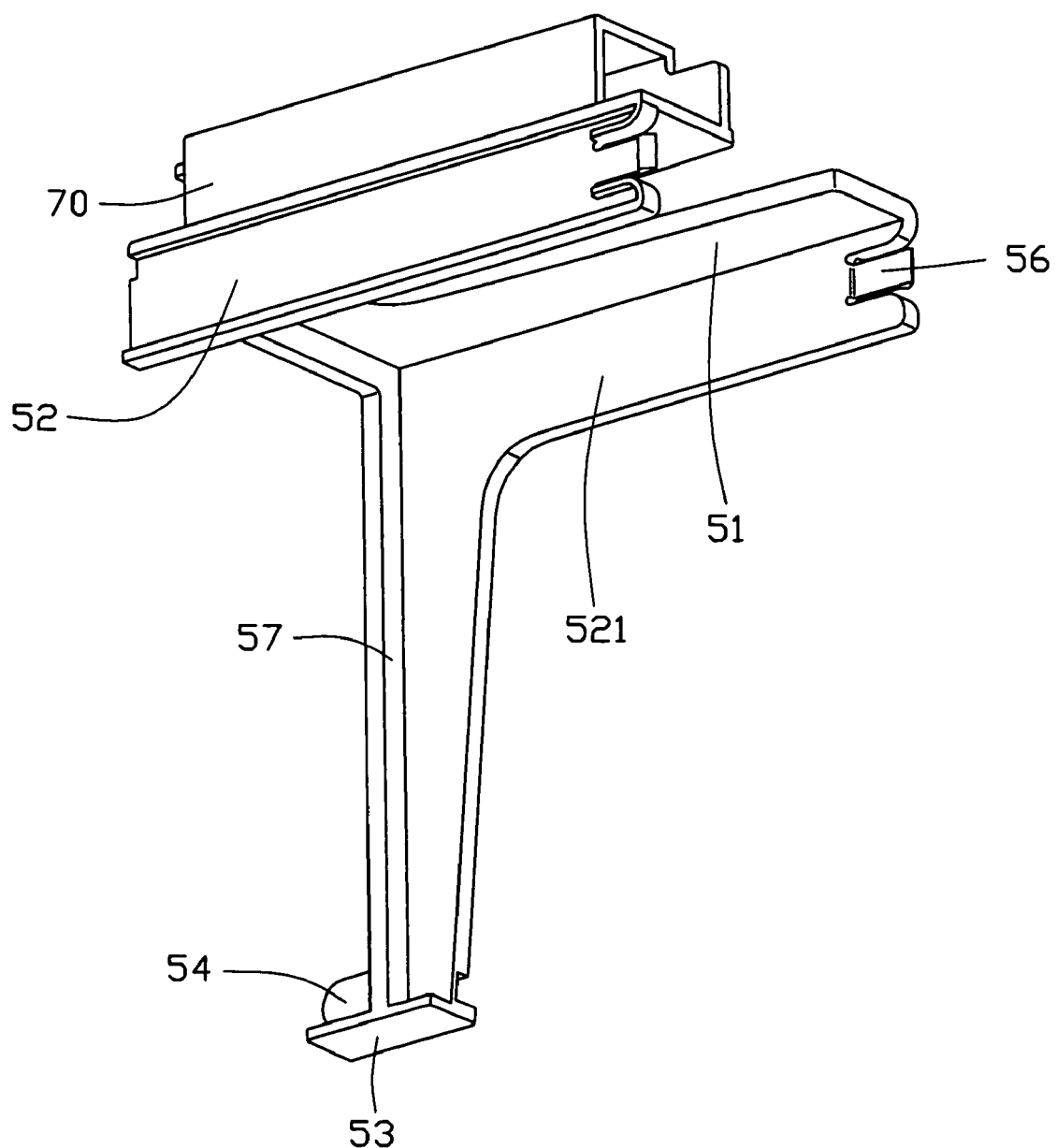
FIG. 4 is similar to FIG. 3, but viewed from still another aspect.

Referring also to FIGS. 3 and 4, the bracket 50 comprises a top wall 51, a pair of side walls 52, 521, and a rear wall frame 57. The side walls 52, 521, and the rear wall frame 57 depend from corresponding edge portions of the top wall 51. A pair of opposite hooks 56 is formed in front portions of the side walls 52, 521 respectively. The side wall 521 is L-shaped. A first actuator 54 extends coplanarly from a bottom portion of the side wall 521. An end board 53 perpendicularly connects with a bottom of the first actuator 54. A first stop block 55 extends outwardly from the first actuator 54. A hollow platform 70 extends from the top wall 51 above the side wall 52. A second actuator 591 is formed from a rear portion of the platform 70. A fastener 58 and a second stop block 59 spaced from the fastener 58 extend from a top wall 71 of the platform 70.

Figure 5:
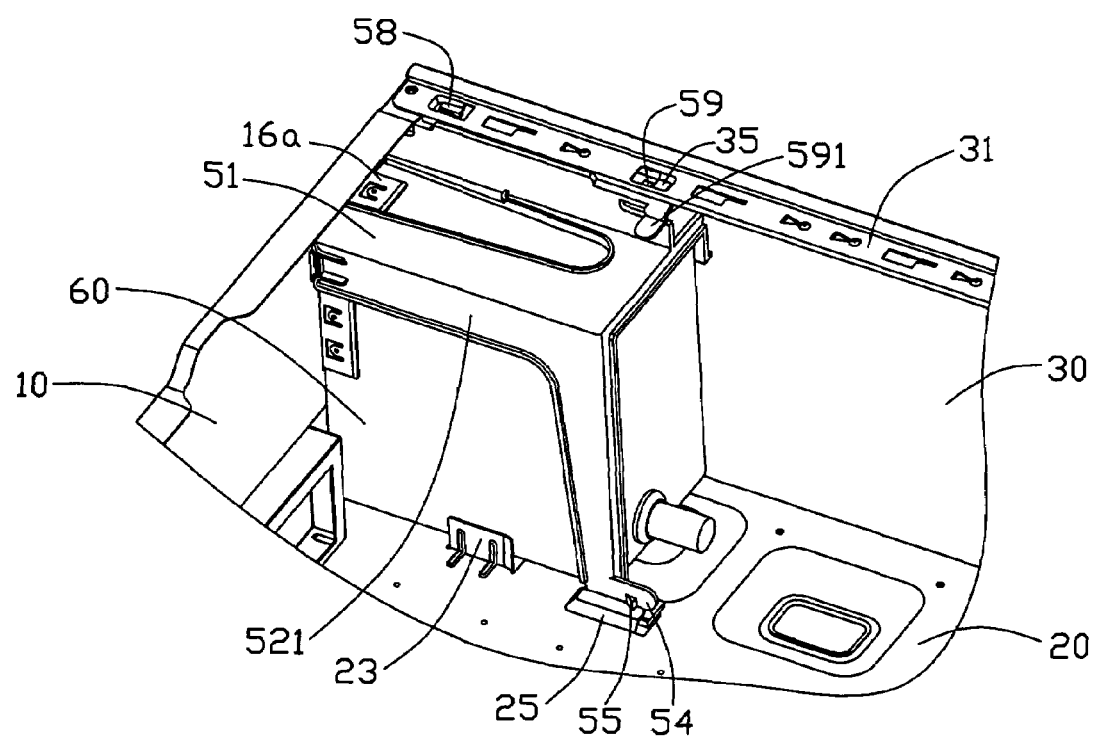
FIG. 5 is substantially a fully assembled view of FIG. 1, showing the power supply secured in a cage of the computer enclosure.

Referring particularly to FIGS. 1, 5 and 6, in assembly of the computer enclosure, the power supply 60 is seated on the support 21 in the cage 40. The power supply 60 is retained between the retaining plates 23 and the projections 24 of the bottom panel 20, and the retaining flanges 16a, 16b of the rear panel 10. The rear wall of the power supply 60 abuts against the rear panel 10, with the pins 15 of the rear panel 10 engaged in corresponding vents of the power supply 60. The bracket 50 is engaged over the power supply 60. The top wall 51, the side walls 52, 521, and the rear wall frame 57 are attached to the cage 40. That is, the hooks 56 of the bracket 50 are engaged in the catches 13 of the rear panel 10. The end board 53 is engaged under the bent strip 25, with the first stop block 55 being retained in the cutout 27 of the bent strip 25. The fastener 58 and the second stop block 59 of the bracket 50 are respectively engaged with the latch bar 33 and the latch hook 35 of the side panel 30.

In disassembly of the computer enclosure, the first actuator 54 is pressed inwardly, the second actuator 591 is pressed downwardly, and the hooks 56 are squeezed toward each other. The bracket 50 is then easily removed from the cage 40. The power supply 60 is then removed from the cage 40.

The computer enclosure in accordance with the present invention readily secures the power supply 60 in the cage 40, and allows ready removal of the power supply 60 from the cage 40. Neither of these operations requires tools or screws. This makes the computer enclosure very convenient and inexpensive.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. An enclosure comprising:
    a cage comprising a plurality of panels, the panels forming a plurality of engaging members; and
    a bracket adapted for attaching a power supply to the cage, the bracket comprising a plurality of walls for sandwiching the power supply therebetween and a plurality of locking members detachably engaging with the engaging members of the cage respectively to fix the bracket to the cage, and a first actuator formed adjacent one of the locking members, wherein the first actuator is deflected to urge said one of the locking members to release from a corresponding engaging member.

2. The enclosure as described in claim 1, wherein the walls of the bracket comprises a top wall, and a pair of side walls extending from the top wall.

3. The enclosure as described in claim 1, wherein said one of the engaging members comprises a bent strip formed on the bottom plate, the bent strip defines a cutout, the first actuator extends from a bottom portion of one of the side walls opposing the side panel of the cage, and said one of the locking members comprises a first stop formed on the first actuator and retained in the cutout.

4. The enclosure as described in claim 2, wherein the panels of the cage comprise a rear panel, a bottom panel, and a side panel.

5. The enclosure as described in claim 4, wherein the rear panel of the cage defines an opening therein adjacent the side panel, the engaging members comprise a pair of catches formed at opposite sides of the opening, the locking members comprise a pair of hooks formed in front portions of side walls of the bracket, the hooks respectively engaging with the catches.

6. The enclosure as described in claim 3, wherein the bracket further comprises a rear wall frame extending downwardly from a rear portion of the top wall, and a platform extending upwardly from the top wall.

7. The enclosure as described in claim 4, wherein the rear panel of the cage comprises a plurality of retaining flanges for retaining the power supply.

8. The enclosure as described in claim 3, wherein the rear panel comprises a plurality of pins around the opening, for being engagingly received in corresponding vents of the power supply.

9. The enclosure as described in claim 6, wherein the platform of the bracket forms a fastener and a second stop thereon, a second actuator is formed on the bracket adjacent the second stop, a flange extends from the side panel of the cage, and the flange has a latch bar and a latch hook provided thereon for respectively engaging with the fastener and the second stop.

10. The enclosure as described in claim 9, wherein the bottom panel of the cage comprises a support oriented parallel to the side panel, and a pair of retaining plates at opposite sides of the support for retaining the power supply.

11. The enclosure as described in claim 10, wherein the support has a pair of projections distal from the rear panel, for retaining the power supply against the rear panel.

12. A computer system comprising:
    a cage comprising a rear panel, a bottom panel, and a side panel, the bottom panel comprising a bent strip defining a cutout therein, the side panel comprising a flange having a latch hook, the rear panel, defining an opening and having a pair of catches formed on opposite sides of the opening;
    a power supply received in the cage and aligned with the opening; and
    a bracket for retaining the power supply in the cage, the bracket comprising a top wall, a pair of side walls, and a rear wall frame cooperatively sandwiching the power supply therebetween, one of the side walls opposing the side panel extending from the top wall to the bent strip of the cage, an actuator extending from said one of the side walls, a first stop being formed on the actuator and engaging in the cutout of the cage, each of the side walls comprising a hook engaging with a respective one of the catches, the top wall comprising a second stop engaging with the latch hook of the cage,
    wherein when the actuator is pushed toward the side panel to release the first stop from the cutout, the hooks can be released from the catches and the second stop can be disengaged from the latch hook thereby disengaging the power supply from the cage.

13. The computer system as described in claim 12, wherein a platform extends upwardly from the top wall of the bracket, the second stop extends from a top of the platform, a second actuator is formed on the bracket adjacent the second stop for facilitating disengaging of the second stop from the latch hook of the cage, and a fastener extends from the top of the platform, the fastener engaging with a latch bar of the flange of the side panel.

14. The computer system as described in claim 13, wherein the rear panel of the cage comprises a plurality of retaining flanges for holding the power supply.

15. The computer system as described in claim 14, wherein the bottom panel of the cage comprises a support parallel to the side panel and corresponding to the opening, and a pair of opposite retaining plates is extends from the bottom panel adjacent the support for sandwiching the power supply therebetween.

16. The computer system as described in claim 15, wherein a pair of projections protrudes from the support distal from the rear panel, for abutting the power supply against the rear panel.

17. The computer system as described in claim 16, wherein the power supply defines a plurality of vents therein, and the rear panel comprises a plurality of pins around the opening engagingly received in corresponding vents.

18. An enclosure assembly comprising:
a cage defining at feast first, second and third panels being perpendicular to one another and forming a corner thereof;
a bracket assembled to said cage for holding a power supply, said bracket including at least one deflectable hook located on a front portion thereof and releasably locked to the first panel, and at least one stop block located on a rear portion thereof and releasably locked to one of said second and third panels by an actuator which is close to said stop block; and
a power supply defining a front face abutting against the first panel, a bottom face seated upon the second panel with a rear face abutting against a projection formed on the second panel, and other faces restrained by said bracket in directions perpendicular to a front-to-back direction.

19. The enclosure as described in claim 18, wherein said stop block is formed on a rear wall frame, and is far from said at least one hook not only in said front-to-back direction but also in a vertical direction.

* * * * *